United States Patent [19]

Mibu et al.

[11] 4,309,702
[45] Jan. 5, 1982

[54] DISPLACEMENT DETECTING APPARATUS

[75] Inventors: Katsutoshi Mibu, Kamagaya; Hikaru Kitsunezaki, Kamakura, both of Japan

[73] Assignee: Sony Corporation, Tokyo, Japan

[21] Appl. No.: 14,318

[22] Filed: Feb. 23, 1979

[30] Foreign Application Priority Data

Feb. 24, 1978 [JP] Japan ............................... 53-19906

[51] Int. Cl.³ ................... G08C 19/22; G08C 19/16; G01B 7/14
[52] U.S. Cl. ................... 340/870.18; 340/870.24; 340/870.25; 340/870.33; 324/208; 360/111; 360/1
[58] Field of Search .............. 340/870.24, 870.32, 340/870.33, 870.22, 870.19, 870.18, 870.25, 870.26; 324/207, 208, 172; 33/125 C, 125 M; 360/1, 111

[56] References Cited

U.S. PATENT DOCUMENTS 3,582,924  6/1971  Uemura et al. .................. 360/1
3,626,397 12/1971  Uemura ......................... 324/208

FOREIGN PATENT DOCUMENTS 1261391  1/1972  United Kingdom .
1272813  5/1972  United Kingdom .

Primary Examiner—James J. Groody
Attorney, Agent, or Firm—Lewis H. Eslinger; Alvin Sinderbrand

[57] ABSTRACT

Apparatus for detecting the displacement of a member having a magnetic scale on which are provided calibrating signals of a predetermined wavelength. First and second magnetic heads are disposed to reproduce the calibrating signals from the magnetic scale; and these heads also are energized with pulse signals, whereby each of the magnetic heads produces a balanced modulated pulse signal derived from the reproduced calibrating signal and the energizing pulse signal supplied thereto. The balanced modulated pulse signals from the two heads are added to obtain a phase modulated pulse signal. A predetermined higher harmonic of the phase modulated pulse signal is selected; and predetermined increments of phase shift in the selected higher harmonic of the phase modulated pulse signal are detected so as to produce output pulse signals representing corresponding increments of displacement.

14 Claims, 11 Drawing Figures

DISPLACEMENT DETECTING APPARATUS

BACKGROUND OF THE INVENTION

This invention relates to displacement detecting apparatus and, more particularly, to apparatus of this type in which digital signals are generated when relative displacement between an object and a sensor exceeds a predetermined incremental amount.

In the control of, for example, a machine tool, it is important to know the displacement of that tool relative to a workpiece. More accurate control over the tool is attained if the control apparatus therefor is a digital control system. Consequently, it is advantageous to provide displacement detecting apparatus which produces displacement-related signals in digital form.

One type of displacement detecting apparatus is described in U.S. Pat. No. 3,582,924, assigned to the assignee of the present invention. In the earlier apparatus, a member, whose displacement is to be detected, is provided with a magnetic scale upon which reference divisions, known as magnetic gratings, which serve as calibrating signals, are recorded. The magnetic gratings exhibit a predetermined wavelength, and a pair of magnetic heads are disposed to reproduce such magnetic gratings, which appears as sinusoidal signals whose amplitudes vary as a function of the displacement of a magnetic grating relative to the magnetic heads. The heads also are energized with an oscillating signal of predetermined frequency, which signal serves as a carrier to be modulated by the reproduced magnetic gratings. The output signal thus produced by each head is a sine (or cosine) function with an envelope also varying as a sine (or cosine) function. That is, the output signal produced by each head appears as a balanced modulated signal.

In accordance with the apparatus described in the aforementioned patent, the two balanced modulated signals produced by the magnetic heads are mixed to produce a phase-modulated signal whose carrier frequency is equal to the carrier of each of the balanced modulated signals. This phase modulated signal then is shaped to a pulse form, and the phase variations of this pulse signal are detected by comparing its phase to the phase of clock pulses, and the thus-detected phase shift is measured to obtain an indication of the amount of displacement.

For accurate digital control over the machine tool, displacement should be measured with high resolution. That is, the smallest incremental amount of displacement which can be sensed should be made as small as possible. For example, if the wavelength of the magnetic gratings is on the other of about 100 microns, it is desirable to measure a displacement as small as 10 microns. This means that the frequency, or repetition rate, of the clock pulses which are used to detect phase modulations should be much greater than the frequency of the phase modulated pulse signal. However, this relationship between the clock and phase modulated pulse signals preferably should not be attained by lowering the frequency of the phase modulated pulse signal because this would undesirably reduce the overall speed of response of the displacement detecting apparatus. Accordingly, depending upon the resolution which is required, displacement detecting apparatus of the aforedescribed type has been proposed wherein the frequency of the phase modulated pulse signal is on the order of 10 to 50 KHz. But, when this frequency is selected, the filter which is used to eliminate unwanted higher frequency signals from the phase modulated signal which is produced by adding the balanced modulated signals derived from the magnetic heads is a passive filter formed of coils and/or capacitors. This results in a bulky and expensive filter which is a significant disadvantage.

The aforementioned disadvantage can be overcome if the frequency of the phase modulated signal is made higher, so that the filtering frequency of the filter likewise can be made higher. It has been proposed to frequency convert the phase modulated signal produced in response to the mixing of the balanced modulated signals obtained from the magnetic heads to a higher carrier frequency. This can be achieved by connecting a balanced modulator to receive the phase modulated signal and by supplying this balanced modulator with a relatively high frequency carrier. The output of the balanced modulator thus is a phase modulated signal of relatively high frequency. Then, the filter, such as a band pass filter, through which this higher frequency phase modulated signal is passed can be a lower cost ceramic filter. The filtered phase modulated signal can be phase detected by supplying it to a phase comparator together with a clock signal whose frequency is the same as the frequency of the carrier which is supplied to the balanced modulator. The output of the phase comparator then may appear as a phase modulated pulse signal of a relatively low repetition rate. Hence, the clock pulses which are used to measure this phase modulation may exhibit a desirably lower frequency.

In the aforementioned apparatus, the magnetic heads which are used to produce the balanced modulated signals are saturable magnetic heads. If these heads are supplied with energizing signals of a frequency equal to, for example, $f_c/2$, the output of the head will include a component whose frequency is equal to $f_c/2$, another component whose frequency is equal to $f_c$, and higher harmonics. In general, the saturable head suppresses the component of frequency $f_c/2$ and is sensitive to the carrier frequency of $f_c$. The balanced modulated signals, each of carrier frequency $f_c$, after being mixed to produce a phase modulated signal, also of frequency $f_c$, are frequency converted by a carrier frequency of, for example, $nf_c$ to a frequency-converted phase modulated signal whose frequency either is equal to $(n-1) f_c$ or $(n+1)f_c$, depending upon the center frequency of the band pass filter. This phase modulated, frequency-converted signal of carrier frequency $(n-1)f_c$ or $(n+1)f_c$ is phase-detected, or demodulated, by a signal of frequency $nf_c$, so as to obtain a phase-modulated component of frequency $f_c$. It is desirable to obtain a phase modulated signal of the relatively higher frequency $(n-1)f_c$ or $(n+1)f_c$ with a simplified circuit configuration. In particular, it would be advantageous to obtain such higher carrier frequencies directly at the outputs of the magnetic heads without requiring the use of a balanced modulator.

OBJECTS OF THE INVENTION

Therefore, it is an object of the prevent invention to provide improved displacement detecting apparatus which avoids the problems noted hereinabove and which is of a relatively simple circuit construction.

Another object of this invention is to provide digital displacement detecting apparatus having a relatively high resolution so as to be capable of detecting relatively small displacements.

A further object of this invention is to provide displacement detecting apparatus which can be used advantageously in a digital machine tool control system.

An additional object of this invention is to provide improved displacement detecting apparatus wherein a scale having calibrating signals of predetermined wavelength is displaced relative to a sensing transducer and displacements which are much smaller than the calibrating signal wavelength are sensed.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for detecting the displacement of a member, wherein the member is provided with a magnetic scale having calibrating signals of a predetermined wavelength thereon. First and second magnetic heads reproduce the calibrating signals as the scale is displaced relative to the heads. These heads also are energized with pulse signals, whereby each head produces a balanced modulated pulse signal derived from the reproduced calibrating signal and from the energizing pulse signal supplied to it. The balanced modulated pulse signals are added to obtain a phase modulated pulse signal, and a predetermined higher harmonic of the phase modulated pulse signal is selected. Detecting circuitry detects predetermined increments of phase shift in the selected higher harmonic of the phase modulated pulse signal to produce output pulse signals which represent corresponding increments of displacment.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
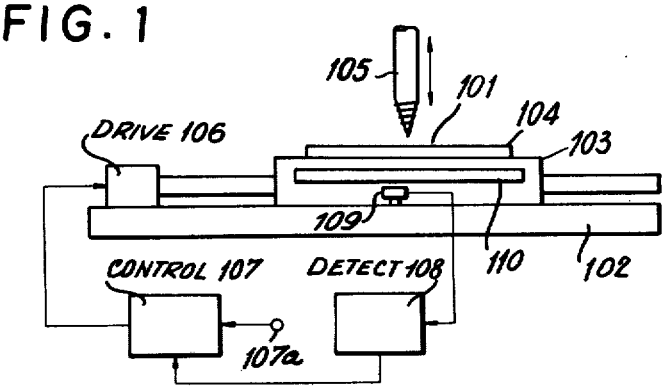
FIG. 1 is a representation of a machine tool control system in which the present invention can be utilized.

Referring now to the drawings, wherein like reference numerals are used throughout, and in particular to FIG. 1, there is illustrated a machine tool control system in which the present invention finds ready application. The machine tool control system includes a machine tool 101, a work bench 103, a workpiece 104, a drive mechanism 106, a drive control device 107 and a displacement detector 108. Machine tool 101 generally includes a working tool element 105 which, when movable in the directions indicated by the arrow, is adapted to selectively contact work piece 104. As shown, the workpiece is supported on work bench 103, the latter being driven by drive mechanism 106 so as to properly position the workpiece relative to tool 105. A base 102 is provided to support work bench 103 and also drive mechanism 106.

Work bench 103 is provided with a magnetic scale 110 upon which are recorded calibrating signals of a predetermined wavelength. As described in aforementioned U.S. Pat. No. 3,582,924, these calibrating signals may constitute reference divisions, or magnetic gratings. A pick-up head 109 is disposed adjacent magnetic scale 110 so as to detect these calibrating signals as work bench 103 is driven therepast. The output of pick-up head 109 is coupled to detector 108, the latter being provided for the purpose of detecting the displacement of the work bench.

Control device 107 may include a counter whose input is coupled to an input terminal 107a to receive a preset count. This count may, for example, identify the particular location to which work bench 103 is to be translated, or displaced, and thereby position workpiece 104 in proper relation to tool 105 for working thereon. The output of detector 108, which may comprise positive direction and negative direction pulse signals, is coupled to control device 107 to increment or decrement a suitable counter therein. When this suitable counter exhibits a count which is equal to the preset count, the activation of drive mechanism 106 is terminated. Thus, work bench 103 will have been translated to the location initially established by the preset count supplied from input terminal 107a. It is appreciated that, as work bench 103 is translated by a predetermined incremental amount, detector 108 generates a pulse representing that incremental translation. Two separate output leads may be provided between detector 108 and control device 107 such that, when work bench 103 is translated in a first direction, pulses are supplied from the detector to the control device over one lead, and when the work bench is translated in the opposite direction, pulses are supplied from the detector to the control device over the other lead. In this manner, control device 107 may be provided with information representing the displacement, and thus the relative position, of work bench 103 with respect to tool 105.

Figure 2:
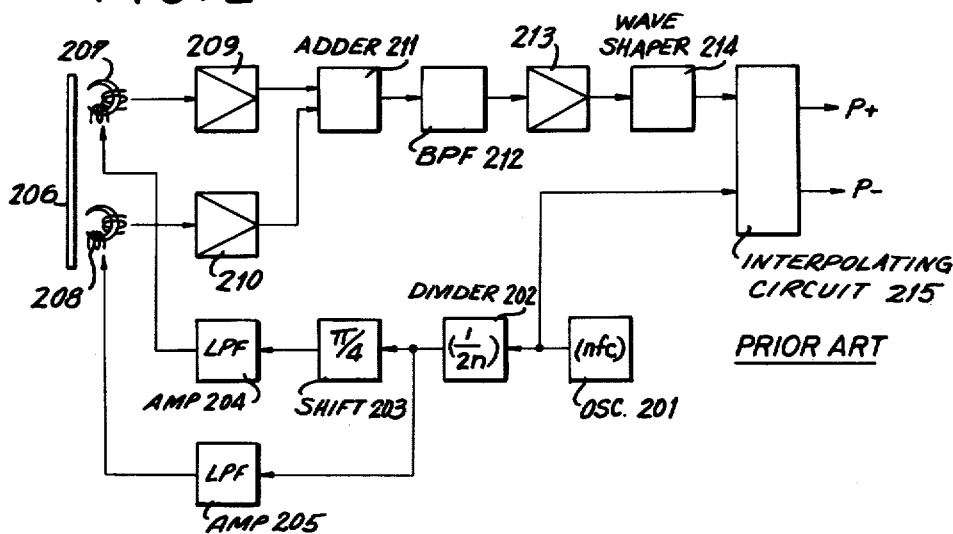
FIG. 2 is a block diagram of one example of a prior art displacement detecting apparatus.

One embodiment of displacement detecting apparatus which can be used in the system shown in FIG. 1 is illustrated in FIG. 2. For the purpose of the present discussion, it will be assumed that, in the illustrated displacement detecting apparatus, the displacement sensing components are fixed and a displaceable member is moved therepast. In FIG. 2, a magnetic scale 206, similar to magnetic scale 110 of FIG. 1, is provided. Pick-up head 109 is illustrated as a pair of magnetic heads 207 and 208. Each head is provided with an energizing coil such that, in addition to reproducing the calibrating signals which are recorded on scale 206, it is adapted to receive energizing signals from a source, to be described. The calibrating signals recorded on magnetic scale 206 exhibit a wavelength λ and, as one example, head 207 and 208 may be spaced apart from each other by an amount equal to $(a + \frac{1}{4})\lambda$, wherein a is an integer (1, 2, ...).

The illustrated displacement detecting apparatus includes an oscillator 201, a frequency divider 202, amplifiers 209, 210, an adder 211, a band pass filter 212, a wave shaper 214 and an interpolating circuit 215. Oscillator 201 is adapted to generate a clock signal having a repetition rate, or frequency, of $nf_c$. The output of this oscillator is coupled to frequency divider 202 which functions to divide the frequency of the clock signal by a factor 2n. Hence, the frequency-divided clock signal obtained from frequency divider 202 has a frequency equal to $f_c/2$. The output of frequency divider 202 is coupled to the energizing windings of heads 207 and 208. A phase shifter 203 and a filter/amplifier 204 are connected in series between frequency divider 202 and head 207. A filter/amplifier 205 is connected in series between the frequency divider and head 208. The purpose of phase shifter 203 is to provide a phase shift equal to π/4 to the frequency-divided clock signal. This phase-shifted clock signal then is filtered and amplified by filter/amplifier 204 so as to be supplied as a substantially sinusoidal signal to the energizing windings of head 207. Filter/amplifier 205 performs a similar function in filtering and amplifying the frequency-divided clock signal so as to supply a substantially sinusoidal signal of frequency $f_c/2$ to head 208. The purpose of phase shift circuit 203 is to provide a phase shift that compensates for the λ/4 displacement of head 207 from head 208.

The signals which are supplied to heads 207 and 208 from frequency divider 202 are energizing signals. Each of the magnetic heads balance modulates the energizing signal supplied thereto with the calibrating signal reproduced from scale 206. These balanced modulated signals are supplied from heads 207 and 208 to adder 211 via amplifiers 209 and 210. The adder serves to combine the balanced modulated signals supplied thereto by mixing same. The output of adder 211 is coupled through band pass filter 212 and amplifier 213 to a wave shaper 214. Band pass filter 212 has a center frequency equal to the frequency of the mixed balanced modulated signals that are supplied thereto by adder 211. Wave shaper 214 serves to amplitude limit the filtered signal obtained from band pass filter 212 so as to produce a rectangular wave signal. This rectangular wave signal is supplied to interpolating circuit 215 together with clock signals of repetition rate $nf_c$ which are generated by oscillator 201.

The manner in which the displacement detecting apparatus shown in FIG. 2 operates now will be described. As scale 206 is translated past heads 207 and 208, the calibrating signals recorded on the scale are reproduced by each of the heads as a sinusoidal function of $(2\pi/\lambda)x$, wherein λ is the wavelength of the calibrating signals and x is the displacement of, for example, a calibrating signal from one of the heads. The clock pulses of frequency $nf_c$ generated by oscillator 201 are divided by frequency divider 202 to clock signals of frequency $f_c/2$. These clock signals are filtered and supplied to heads 207 and 208 as energizing signals. The energizing signal supplied to head 207 is a sinusoidal signal having a frequency equal to $f_c/2$. This sinusoidal signal is phase shifted by π/4 from the sinusoidal energizing signal supplied to head 208. Each of magnetic heads 207 and 208 modulates the sinusoidal energizing signal supplied thereto with the calibrating signal which is reproduced from scale 206. Because of the π/4 phase shift in the energizing signals supplied to heads 207 and 208, head 207 produces a balanced modulated signal which may be represented as $A \sin 2\pi f_c t \cos (2\pi/\lambda)x$. The balanced-modulated signal produced by head 208 may be expressed as $B \cos 2\pi f_c t \sin (2\pi/\lambda)x$. These balanced-modulated signals are amplified by amplifiers 209 and 210 and combined, or mixed, in adder 211. Assuming $A = B$, when the balanced modulated signals are added, the output of adder 211 can be expressed as $C \sin (2\pi f_c t + (2\pi/\lambda)x)$. It is seen that this signal is a phase modulated signal whose carrier frequency is equal to $f_c$ and whose phase varies as a function of $(2\pi/\lambda)x$. Band pass filter 212, whose pass band is centered on carrier frequency $f_c$, eliminates unwanted components from the phase modulated signal. This filtered phase modulated signal then is amplified by amplifier 213 and shaped to a rectangular pulse form in wave shaper 214. The phase of this rectangular pulse signal obtained at the output of wave shaper 214 includes the phase variations of the phase modulated signal produced by adder 211 and is supplied to interpolating circuit 215 together with clock pulses of frequency $nf_c$ produced by oscillator 201. These clock pulses are used by the interpolating circuit to sense the phase variations in the rectangular pulse signal; and when the phase varies in, for example, the positive direction, to exceed a predetermined incremental amount, a positive direction displacement pulse P+ is produced. Conversely, when this phase varies in the negative direction to exceed a predetermined incremental amount, a negative direction displacement pulse P− is produced. An example of a suitable interpolating circuit which functions to measure the phase variation of the rectangular pulse signal and to generate these positive direction and negative direction output pulses is described in Japanese Patent Publication No. 28032/1975. Thus, when x, that is, the displacement of scale 206 relative to heads 207 and 208, exceeds some amount, such as a quantity of microns, the positive or negative direction pulse is produced.

As mentioned above, in the prior art displacement detecting apparatus of FIG. 2, if high resolution is desired, the frequency $nf_c$ of the clock pulses supplied to interpolating circuit 215 by oscillator 201 should be much greater than the frequency $f_c$ of the phase modulated rectangular pulse signal supplied to the interpolating circuit by wave shaper 214. However, this relationship should not be obtained at the expense of making the carrier frequency $f_c$ of the phase modulated signal very low because such a low carrier frequency would reduce the speed of response of the displacement detecting apparatus. Suitable carrier frequency $f_c$ may be on the order of 10 to 50 KHz. At such a carrier frequency, band pass filter 212 should be a passive filter formed of coils and/or capacitors. Such a filter is quite bulky and expensive.

Figure 3:
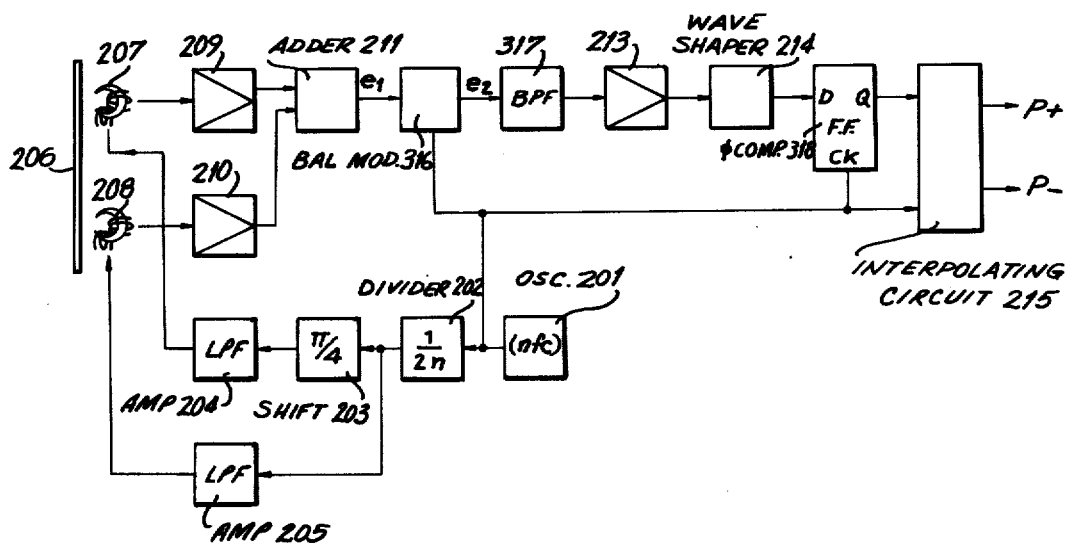
FIG. 3 is a block diagram of a proposed improvement to the prior art displacement detecting apparatus.

In order to avoid the aforementioned disadvantage of the apparatus shown in FIG. 2, an improvement therein has been proposed, as illustrated in FIG. 3.

In the embodiment shown in FIG. 3, a balanced modulator 316 is provided between the output of adder 211 and the input of the band pass filter, and a phase comparator 318 is connected between the output of wave shaper 214 and the input of interpolating circuit 215. Balanced modulator 316 is supplied with a reference signal derived from oscillator 201 and having a frequency equal to $nf_c$. The balanced modulator serves to frequency convert the phase modulated signal supplied from adder 211 to a higher frequency by modulating the phase modulated signal with the reference signal. The output of the balanced modulator is formed of the upper and lower sidebands of a phase modulated signal having a carrier frequency equal to the sum of the frequencies supplied to the balanced modulator and equal to the difference between these frequencies, respectively. Thus, if the phase modulated signal produced by adder 211 is represented as $$e_1 = E \sin\left(2\pi f_c t + \frac{2\pi}{\lambda} x\right),$$

then the output $e_2$ of balanced modulator 316 may be expressed as:

$$e_2 = \frac{E}{2}\left\{ \cos 2\pi\left[(n-1)f_c t - \frac{x}{\lambda}\right] - \cos 2\pi\left[(n+1)f_c t + \frac{x}{\lambda}\right]\right\}$$

Band pass filter 212 of FIG. 2 is replaced by band pass filter 317 of FIG. 3, the latter having its pass band centered either on the carrier frequency of the lower side band $(n-1)f_c$ or on the carrier frequency of the upper side band $(n+1)f_c$. Hence, the signal output of band pass filter 317 is a phase modulated signal having phase variations that are a function of $(2\pi/\lambda)x$, and a carrier frequency $(n\pm1)f_c$. It is appreciated that this center frequency of band pass filter 317 is much higher than the center frequency of band pass filter 212. Consequently, band pass filter 317 may be formed of a ceramic filter which is of relatively low cost and size.

The higher frequency phase modulated signal produced at the output of band pass filter 317 is amplified by amplifier 213 and shaped by wave shaper 214 to form a phase modulated rectangular pulse signal. The phase variations of this rectangular pulse signal are detected by phase comparator 318. In the embodiment illustrated in FIG. 3, phase comparator 318 is a timing pulse controlled flip-flop circuit, such as a D-type flip-flop circuit whose data input terminal is connected to the output of wave shaper 214 and whose clock input terminal is connected to receive the clock pulses generated by oscillator 201. Phase comparator 318 serves to convert the phase modulated rectangular pulse signal of repetition rate $(n\pm1)f_c$ produced by wave shaper 214 to a rectangular wave signal having a repetition rate $f_c$, and having the phase variations which are included in the higher frequency phase modulated rectangular pulse signal. Thus, the output of phase comparator 318 is equal to the output of wave shaper 214 of FIG. 2. Interpolating circuit 215 operates to sense the phase variations in this rectangular waveform to produce the aforementioned positive direction and negative direction pulses P+ and P−, respectively.

In the embodiment of FIG. 3, the frequency of the clock pulses supplied to interpolating circuit 215 from oscillator 201 can be reduced. Moreover, since the phase modulated signal produced by adder 211 is frequency converted to a higher frequency, there is no difficulty of slow response time. However, the use of balanced modulator 316 requires the addition of a relatively complicated circuit, with a concomitant increase in cost. It would be advantageous if the phase modulated signal can have the higher frequency $(n-1)f_c$, but without requiring the use of a balanced modulator.

Figure 4:
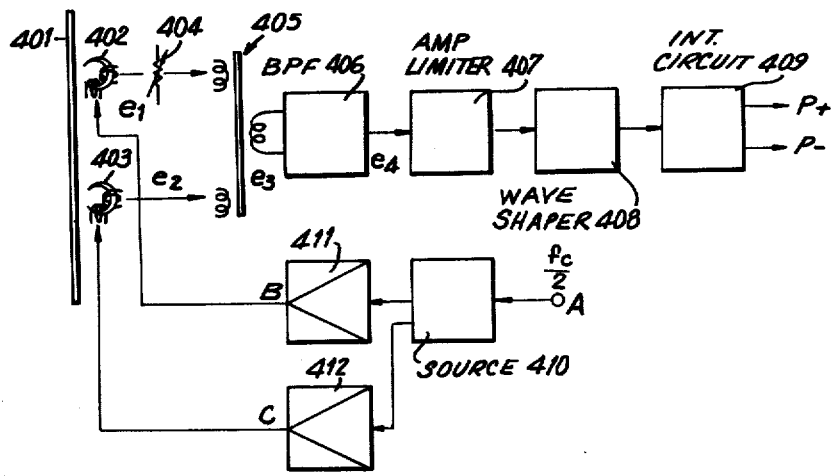
FIG. 4 is a block diagram of an embodiment of the present invention.

The embodiment of the present invention illustrated in FIG. 4 achieves the desired objective of simplifying the displacement detecting apparatus yet, desirably, provides a phase modulated signal of relatively higher frequency $(n-1)f_c$. The illustrated apparatus is comprised of a source 410 of energizing signals, amplifiers 411 and 412, an adder 405, a band pass filter 406, an amplifier/limiter 407, a wave shaper 408 and an interpolating circuit 409. Source 410 is connected to an input terminal A whereat pulse signals of repetition rate $f_c/2$ are provided. Such pulse signals may be supplied from an oscillator and a frequency divider similar to oscillator 201 and frequency divider 202, described above. The source 410 is adapted to produce two trains of pulse signals, each having the repetition rate $f_c/2$, these two trains of pulse signals being out of phase with each other by $\pi/4$. Hence, this source may include a phase shifter similar to aforedescribed phase shifter 203. One output of source 410 is connected to the energizing windings of magnetic head 402 by amplifier 411. The other output of the source is connected to the energizing windings of magnetic head 403 by amplifier 412. Thus, energizing signals B and C, both of pulse waveform, are supplied to the magnetic heads. Energizing pulses B are shifted by $\pi/4$ with respect to energizing pulses C.

The displacement detecting apparatus includes a magnetic scale 401, similar to aforedescribed magnetic scale 206, having calibrating signals recorded thereon, these calibrating signals having the wavelength $\lambda$. Heads 402 and 403 are saturable magnetic heads and, thus, suppress the carrier component of frequency $f_c/2$ of the energizing signals, but are sensitive to the second harmonic of such energizing signals having the frequency $f_c$. The energizing signal supplied to each head and the calibrating signal reproduced by that head are balanced modulated therein. Since each energizing signal is a pulse signal, the balanced modulated signals $e_1$ and $e_2$ produced by heads 402 and 403, respectively, are pulse signals having a component that varies as a function of the cosine or sine of $(2\pi/\lambda x)$.

The balanced modulated signals produced by heads 402 and 403 are coupled to adder 405 via an amplitude adjusting circuit 404. This amplitude adjusting circuit, illustrated herein as a variable resistor, serves to equalize the amplitudes of the balanced modulated signals $e_1$ and $e_2$. In particular, and as will be described, the amplitude adjusting circuit may serve to equalize the amplitudes of a particular higher harmonic of the balanced modulated signals. Adder 405 is illustrated as a summing transformer whose input windings receive the balanced modulated signals $e_1$ and $e_2$, respectively, this summing transformer having an output winding for producing an output rectangular waveform signal $e_3$ which is the summation of the balanced modulated signals $(e_3 = e_1 + e_2)$. The output of adder 405 is coupled to a band pass filter 406. This band pass filter has its pass band centered on a frequency which is equal to a particular higher harmonic included in the phase modulated rectangular waveform $e_3$. For example, the center frequency of band pass filter 406 may be equal to $(n-1)f_c$.

The output e₄ of this band pass filter thus is a sinusoidal phase modulated signal having the carrier frequency (n−1)f_c. This signal e₄ is applied to amplifier/limiter 407 which converts the sinusoidal waveform to a rectangular waveform. This rectangular waveform is shaped to have the desired duty cycle in wave shaper 408, and the output of the wave shaper is supplied to interpolating circuit 409, described in greater detail below.

Figure 5:
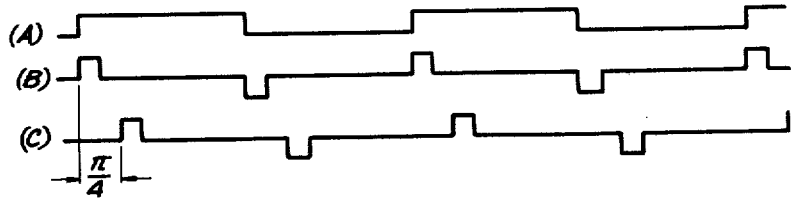
FIGS. 5A–5C are waveform diagrams of the energizing signals which are used in the embodiment shown in FIG. 4.
Figure 6:
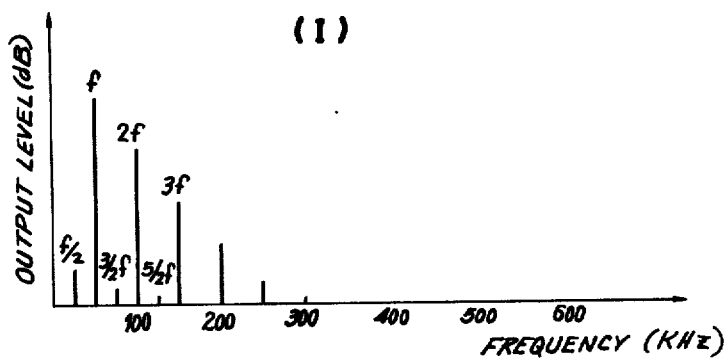
FIG. 6 graphically represents one improvement of the present invention over prior art apparatus.
Figure 6:
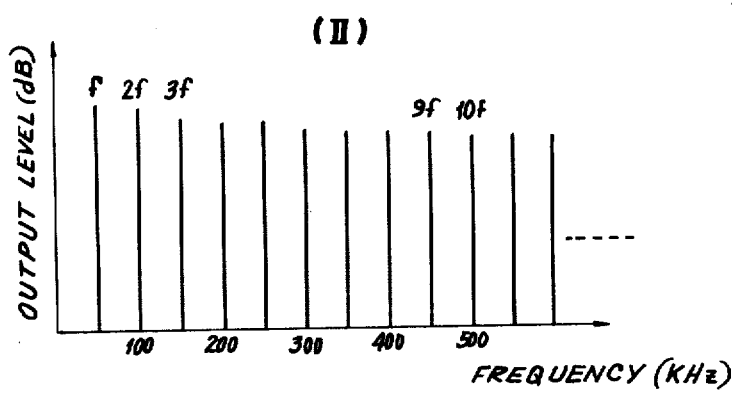

In operation, let it be assumed that the pulse signal supplied from input terminal A to source 410 appears as shown in FIG. 5A. The source generates positive-going and negative-going pulses B and C, shown in FIGS. 5A and 5C, which are phaseshifted with respect to each other by $\pi/4$. Pulse signals B and C, both of repetition rate $f_c/2$, are used to energize heads 402 and 403. Head 402 produces the balanced modulated signal $e_1$ from the energizing pulses B supplied thereto and from the calibrating signals which are reproduced from magnetic scale 401. Similarly, head 403 produces the balanced modulated signal $e_2$ from the energizing pulses C supplied thereto and from the calibrating signals which it reproduces from scale 401. These balanced modulated signals are pulse signals and, thus, include the fundamental frequency $f_c$ and higher harmonics thereof. Balanced modulated signals $e_1$ and $e_2$ may be represented as:

$$e_1 = E_{11} \sin\omega t \cos\frac{2\pi}{\lambda} x + E_{12} \sin 2\omega t \cos\frac{2\pi}{\lambda} x \ldots + \quad (1)$$
$$E_{19} \sin 9\omega t \cos\frac{2\pi}{\lambda} x + \ldots + E_{1n} \sin n\omega t \cos\frac{2\pi}{\lambda} x$$

$$e_2 = E_{21} \cos\omega t \sin\frac{2\pi}{\lambda} x + E_{22} \cos 2\omega t \sin\frac{2\pi}{\lambda} x \ldots + \quad (2)$$
$$E_{29} \cos 9\omega t \sin\frac{2\pi}{\lambda} x + \ldots + E_{2n} \cos n\omega t \sin\frac{2\pi}{\lambda} x$$

wherein $\omega$ is $2\pi f_c$. The output levels of these harmonics are graphically depicted in FIG. 6(II). The comparable harmonics which are produced at the outputs of head 207 and 208 when energized by sinusoidal signals rather than pulse signals are graphically depicted in FIG. 6(I). It is seen that, in accordance with the present invention wherein the head energizing signals are pulse signals, the output levels of the higher harmonics are considerably greater than for the prior art apparatus which utilizes sinusoidal energizing signals.

Adder 405 adds the signals of equations (1) and (2) to produce the phase modulated pulse signal $e_3$, which may be expressed as:

$$e_3 = e_1 + e_2 \quad (3)$$
$$= E_1 \sin\left(\omega t + \frac{2\pi}{\lambda} x\right) + E_2 \sin\left(2\omega t + \frac{2\pi}{\lambda} x\right) \ldots +$$
$$E_n \sin\left(n\omega t + \frac{2\pi}{\lambda} x\right)$$

It should be appreciated that, although adder 405 is shown as a summing transformer, other adding circuits may be used.

For the purpose of the present discussion, let it be assumed that the center frequency (n−1)f_c of band pass filter 406 is equal to the ninth harmonic frequency 9f_c. Hence, the output of the band pass filter will be a phase modulated sinusoidal signal $e_4$, expressed as:

$$e_4 = E_9 \sin\left(9\omega t + \frac{2\pi}{\lambda} x\right) \quad (4)$$

Since a particular harmonic is selected by the band pass filter, amplitude adjusting circuit 404 may, if desired, be of the type which equalizes this harmonic of the balanced modulated signals $e_1$ and $e_2$. That is, the ninth harmonic, for example, of the balanced modulated signal $e_1$ may be adjusted so as to be equal in amplitude to the ninth harmonic of the balanced modulated signal $e_2$.

The output of band pass filter 406 is seen to be a phase modulated signal of a higher frequency, similar to the output of balanced modulator 316 of FIG. 3. Of course, in the embodiment shown in FIG. 4, the balanced modulator is not needed.

The phase modulated signal $e_4$ is converted to a phase modulated rectangular wave signal by amplifier/limiter 407 and wave shaper 408. Hence, the output of wave shaper 408 is similar to the output of wave shaper 214 of the previously described apparatus. This phase modulated rectangular wave signal is supplied to interpolating circuit 409 which senses the phase modulations therein to produce positive direction pulses P+ and negative direction pulses P− which represent positive and negative incremental displacements of scale 401 with respect to heads 402 and 403.

Figure 7:
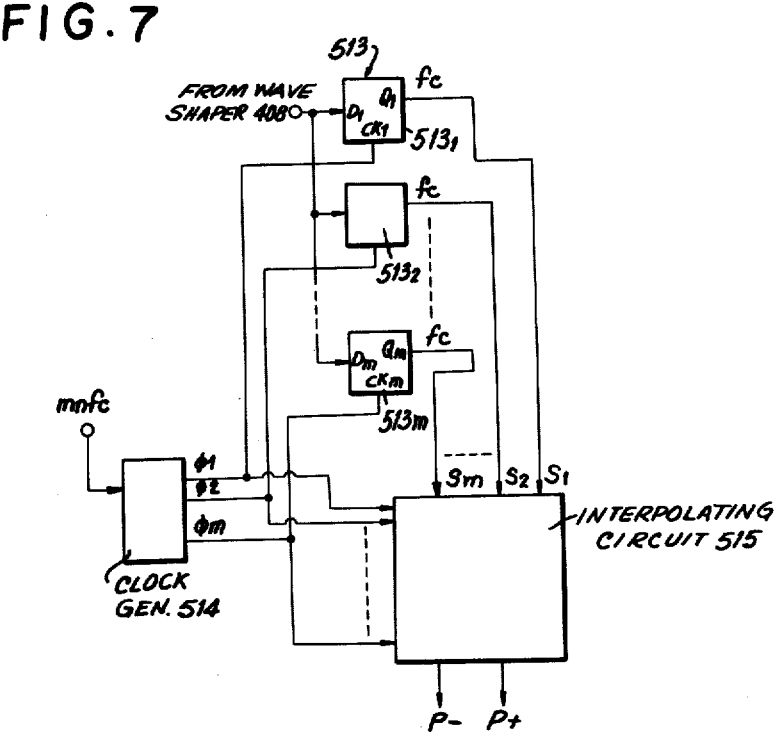
FIG. 7 is a partial logic, partial block diagram of the interpolating circuit which is used in FIG. 4.

One embodiment of interpolating circuit 409 is shown in the partial block, partial logic diagram of FIG. 7. The interpolating circuit is comprised of a phase detecting circuit 513 formed of m phase detecting stages, wherein m is an integer, a clock generator 514 and an interpolating circuit 515, the latter being described in greater detail in FIG. 10. Each phase detecting stage included in phase detector 513 is, for example, a timing pulse controlled flip-flop circuit, such as a D-type flip-flop, having a data input terminal and a clock pulse input terminal. The data input terminals $D_1$, $D_2$, ... $D_m$ of phase detecting stages $513_1$, $513_2$, ... $513_m$ are connected in common to the output of wave shaper 408 for receiving the phase modulated rectangular waveform of repetition rate (n−1)f_c, which has been assumed herein to be equal to 9f_c. The clock pulse input $CK_1$, $CK_2$, ... $CK_m$ of the phase detecting stages are connected to respective outputs of clock generator 514 for receiving respective phases $\phi_1$, $\phi_2$, ... $\phi_m$, respectively, of clock signals. As used in the instant specification, the symbol $\phi$ is the Greek letter "phi". The outputs $Q_1$, $Q_2$, ... $Q_m$ of phase detecting stages $513_1$, $513_2$, ... $513_m$ are connected to respective inputs of interpolating circuit 515 for supplying pulse width modulated rectangular waveforms $S_1$, $S_2$, ... $S_m$, respectively.

Figure 8:
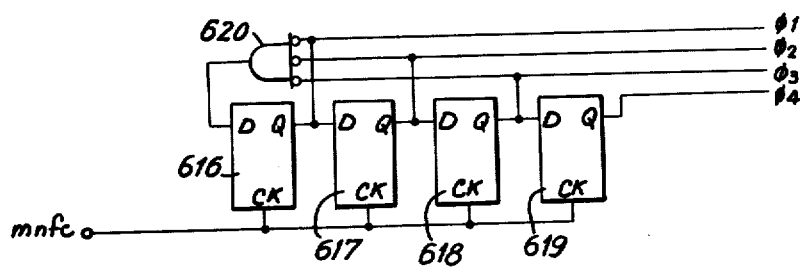
FIG. 8 is a logic diagram of the clock generator which is used in the apparatus shown in FIG. 7.

Clock generator 514, shown in one embodiment in FIG. 8, includes an input terminal connected to receive clock pulses of a relatively higher frequency mnf_c, and is adapted to generate respective phases $\phi_1$, $\phi_2$, ... $\phi_m$ of clock pulses, each of the frequency nf_c. That is, the clock generator divides the input clock pulses of frequency mnf_c by the factor m. Hence, each phase $\phi_1$ ... $\phi_m$ of clock pulses supplied to phase detector 513 is of the frequency nf_c, and each phase is phase-shifted from its next following phase by the amount $(2\pi/m)$.

In operation, phase detecting stage $513_1$, for example, is supplied with the phase modulated rectangular pulse signal of frequency (n−1)f_c at its $D_1$ data input terminal. The phase of this phase modulated rectangular pulse signal is compared to the phase of clock phase $\phi_1$ generated by clock generator 514. The output of phase detecting stage $513_1$ is a pulse phase modulated rectangular waveform of repetition rate $f_c$ (i.e., the difference between the frequencies of the clock phase and the phase modulated rectangular pulse signal supplied thereto) whose duty cycle varies as a function of the phase modulation. Each of remaining stages $513_2, \ldots 513_m$ also produces a pulse phase modulated rectangular waveform of repetition rate $f_c$, but each such pulse width modulated rectangular waveform is offset, or phase-shifted, from the next-following pulse width modulated rectangular waveform by an amount equal to $(2\pi/m)$. That is, as the clock phases $\phi_1 \ldots \phi_m$ are phase-shifted with respect to each other, so too are pulse width modulated rectangular waveforms $S_1 \ldots S_m$.

An example of clock generator 514 now will be described with reference to the logic diagram shown in FIG. 8. In the interest of simplification, it is assumed that this clock generator generates four phases (m=4) of clock pulses, that is, clock phase $\phi_1 \ldots \phi_4$. The clock generator is comprised of four timing pulse controlled flip-flop circuits 616, 617, 618 and 619, such as D-type flip-flop circuits, all having their clock pulse inputs CK connected in common to receive the clock pulses of frequency $mnf_c$. The Q output of flip-flop circuit 616 is connected to the data input D of the following flip-flop circuit 617 whose Q output is connected to the D input of the following flip-flop circuit 618 whose Q output is connected to the D input of the following flip-flop circuit 619. In addition, a NOR gate 620 has its respective inputs connected to the Q outputs of flip-flop circuits 616, 617 and 618, and its output connected to the D input of flip-flop circuit 616.

The operation of the clock generator shown in FIG. 8 is represented by the timing waveforms shown in FIGS. 9A-9E. Let it be assumed, initially, that a binary "1" is present in flip-flop circuit 619, whereupon its Q output produces a binary "1"; while the remaining flip-flop circuits 616-618 each store a binary "0". Hence, each input of NOR gate 620 is provided with a binary "0", thereby applying a binary "1" to the D input of flip-flop circuit 616. In response to the first clock pulse shown in FIG. 9A, flip-flop circuit 616 is set to store a binary "1", while the contents previously stored in flip-flop circuits 616, 617 and 618 are shifted into flip-flop circuits 617, 618 and 619, respectively. Hence, a binary "1" is provided at the Q output of flip-flop circuit 616 only. Clock phase $\phi_1$ thus is a binary "1" at the first clock pulse input, shown in FIG. 9B. Since a binary "1" is provided at the Q output of flip-flop circuit 616, NOR gate 620 now supplies a binary "0" to the D input of flip-flop circuit 616.

Figure 9:
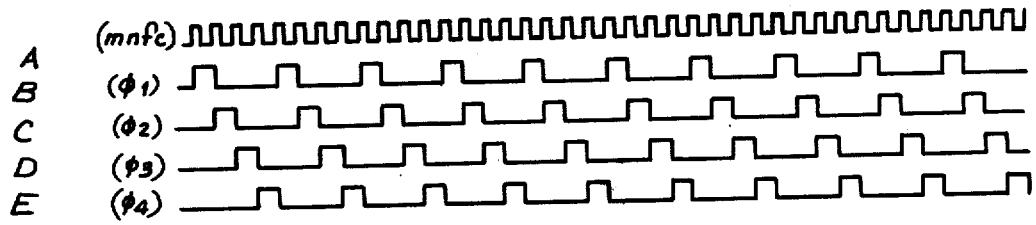
FIGS. 9A–9E are timing waveforms which represent the clock pulses that are generated by the clock generator shown in FIG. 8.

In response to the next clock pulse shown in FIG. 9A, the binary "1" previously stored in flip-flop circuit 616 is shifted into flip-flop circuit 617, and flip-flop circuit 616 is reset to a binary "0". Thus, clock phase $\phi_2$, obtained from the Q output of flip-flop circuit 617, now is a binary "1" as shown in FIG. 9C. In response to the next clock pulse of FIG. 9A, flip-flop circuit 617 is reset, and the binary "1" previously stored therein is shifted into flip-flop circuit 618. Hence, clock phase $\phi_3$ now is a binary "1" as shown in FIG. 9D. At the next clock pulse of FIG. 9A, flip-flop circuit 618 is reset to a binary "0", and the binary "1" previously stored therein is shifted into flip-flop circuit 619. Therefore, clock phase $\phi_4$ now is a binary "1", as shown in FIG. 9E. At this time, a binary "0" is supplied to each input of NOR gate 620, thereby resulting in a binary "1" applied to the D input of flip-flop circuit 616. Consequently, in response to the next clock pulse of FIG. 9A, flip-flop circuit 619 is reset, and flip-flop circuit 616 is set to a binary "1". This operation is repeated cyclically, whereby the repetition rate of each clock phase is one-fourth the repetition rate of the clock pulses shown in FIG. 9A, or $nf_c$. It has been assumed, in the foregoing discussion, that $(n-1)=9$, and, therefore, $n=10$. The phase displacement between successive clock phases is seen to be $(2\pi/4)=(\pi/2)$.

When the clock generator shown in FIG. 8 is used in the embodiment of FIG. 7, phase detector 513 is comprised of four phase detecting stages, each stage being supplied with a clock phase of $nf_c$ (e.g. $10f_c$) and a phase modulated rectangular pulse signal repetition rate $(n-1)f_c$, e.g. $9f_c$. The output of each stage thus is a pulse phase modulated rectangular waveform of repetition rate $f_c$, and the pulse width modulated rectangular waveforms of adjacent phase detecting stages are phase shifted relative to each other by $(\pi/2)$.

An embodiment of interpolating circuit 515 now will be described with reference to FIG. 10, wherein this interpolating circuit is shown as a phase sensor comprised of m phase sensing stages 721, 722, 723 and 724. Consistent with the foregoing example, it is assumed that m=4. Phase sensing stages 721-724 are substantially identical in construction and, in the interest of brevity, only stage 721 is shown in detail. Each stage is supplied with a respective pulse phase modulated rectangular waveform and the clock phase which had been used to derive that waveform. Thus, stage 721 is supplied with pulse width modulated rectangular waveform $S_1$ and with clock phase $\phi_1$.

Phase sensing stage 721 is comprised of timing pulse controlled flip-flop circuits, such as D-type flip-flop circuits, 725 and 726, NOR gates 728 and 729, AND gates 730, 731 and 732, and a shift register 727. Flip-flop circuit 725 has its data input D connected to receive pulse width modulated rectangular waveform $S_1$ and its clock pulse input connected to receive clock phase $\phi_1$. The Q output of flip-flop circuit 725 is connected to the D input of flip-flop circuit 726 and, in addition, to one input of NOR gate 729. Flip-flop circuit 726 has its clock pulse input CK connected to receive clock phase $\phi_1$, and its Q output connected to the other input of NOR gate 729. NOR gate 729 is adapted to produce a load pulse in response to, for example, the negative transition in waveform $S_1$, this load pulse being supplied to the load input of shift register 727.

NOR gate 728 has one input connected to receive waveform $S_1$ and another input connected to the Q output of flip-flop circuit 725. The output of NOR gate 728 is connected to an inverting input of AND gate 732, this AND gate including another input connected to receive clock phase $\phi_1$. The combination of flip-flop circuit 725, NOR gate 728 and AND gate 732 functions to subtract, or delete, one pulse from the train of clock pulses included in clock phase $\phi_1$. The output of AND gate 732 is connected to the clock pulse input of shift register 727.

Shift register 727 is shown as a four-stage shift register having input terminals A-D. Input terminals A, B and D are connected in common to, for example, a source of binary "0", and input terminal C is connected to a source of binary "1". In response to a load pulse supplied to the load input thereof, and in synchronism with a clock pulse supplied to its clock pulse input, shift register 727 is loaded with the signals supplied to its input terminals A-D. In the illustrated example, shift register 727 initially is loaded with the binary signal 0010. Thereafter, in the absence of a load pulse supplied thereto, the contents of this shift register are circulated in response to each clock pulse supplied thereto by clock phase $\phi_1$. Each stage of shift register 727 includes an output terminal $Q_A$, $Q_B$, $Q_C$ and $Q_D$, respectively. Depending upon the binary signal stored in the shift register, these output terminals provide corresponding binary signals. The $Q_B$ output is connected to AND gate 731, and the $Q_D$ output is connected to AND gate 730. In addition, the $Q_D$ output is fed back to an input terminal so as to recirculate the contents of the shift register until another load pulse is supplied thereto. Each of AND gates 730 and 731 additionally includes another input connected to the output of NOR gate 727, and a further input supplied with clock pulses.

AND gate 730 is adapted to produce an output pulse $U_1$, which represents the positive displacement of, for example, scale 401 with respect to heads 402 and 403 (FIG. 4) which exceeds a predetermined incremental amount. AND gate 731 is adapted to produce an output pulse $D_1$ which represents a negative displacement that exceeds a predetermined incremental amount. All of the remaining stages 722, 723 and 724 function to produce similar positive direction output pulses $U_2$, $U_3$ and $U_4$, respectively, as well as negative direction output pulses $D_2$, $D_3$ and $D_4$. All of these positive direction output pulses are supplied to an OR gate 733; and all of the negative direction output pulses are supplied to an OR gate 734. The output of OR gate 733 constitutes the positive direction pulse P+; and the output of OR gate 734 constitutes the negative direction pulse P−.

The manner in which the embodiment illustrated in FIGS. 4 and 10 operates now will be described with reference to the waveform diagrams of FIGS. 11A-11K. Let it be assumed that the pulse width modulated rectangular waveform $S_1$ appears as shown in FIG. 11A, and that clock phase $\phi_1$ appears as shown in FIG. 11B. For convenience, the duty cycle of the clock pulse has been modified from that shown in FIG. 9B, but this has no affect upon the operation of the interpolating circuit. Consistent with the foregoing assumption, the repetition rate of rectangular waveform $S_1$ is assumed to be $f_c$, and the repetition rate of clock phase $\phi_1$ is assumed to be $10f_c$. As a numerical example, the repetition rate of waveform $S_1$ is on the order of 50 KHz, and the repetition rate of clock phase $\phi_1$ is on the order of 500 KHz. It is appreciated that waveforms $S_2$-$S_4$ also are pulse phase modulated rectangular waveforms which are displaced from each other by one-fourth the period of each clock phase.

Rectangular waveform $S_1$ is produced by phase detecting stage $513_1$ (FIG. 7) and, therefore, is synchronized with clock phase $\phi_1$. It is assumed that the negative transition in waveform $S_1$ occurs immediately following, or just slightly delayed from, the negative transition in clock phase $\phi_1$. Accordingly, the Q output of flip-flop circuit 725 does not change from a binary "1" to a binary "0" until almost one full period of clock phase $\phi_1$ following the negative transition in waveform $S_1$. This means that, during one period of the clock phase following this transition in $S_1$, a binary "0" is supplied to one input of NOR gate 728, corresponding to the lower level of waveform $S_1$, and a binary "0" is supplied to the other input of this NOR gate by the Q output of flip-flop circuit 725. For this one period of clock phase $\phi_1$, NOR gate 728 supplies a binary "1" to AND gate 732, as shown in FIG. 11C. This binary "1" inhibits AND gate 732 from responding to a clock pulse, whereby one clock pulse is subtracted, or deleted, from the output of the AND gate, as shown in FIG. 11E. That is, the clock pulse of clock phase $\phi_1$ which is produced during the duration that NOR gate 728 produces a binary "1" does not pass through AND gate 732. Of course, once NOR gate 728 is returned to its binary "0" output level, AND gate 732 once again is enabled to pass successive clock pulses.

When flip-flop circuit 725 is reset, corresponding to the negative transition in the output pulse of NOR gate 728, shown in FIG. 11C, flip-flop circuit 726 remains in its set state until the next following clock pulse in clock phase $\phi_1$. That is, following the termination of the output pulse of NOR gate 728, both the Q output of flip-flop circuit 725 and the Q output of flip-flop circuit 726 are a binary "0" for the duration of one clock pulse period. Hence, NOR gate 729 is supplied with a binary "0" at each of its inputs to produce the output pulse shown in FIG. 11D. Upon the occurrence of the next following clock pulse, flip-flop circuit 726 is reset so as to terminate the output pulse of NOR gate 729. Thus, the output pulse of NOR gate 729 has a duration equal to one clock pulse period. This output pulse is supplied to the load input of shift register 727. At the negative transition of the clock pulse which appears at the output of AND gate 732 during the duration of the pulse output of NOR gate 729, shift register 727 is loaded with the preset signal 0010 supplied to its inputs A-D, respectively. This loaded preset signal is shown in FIGS. 11F–11I. Then, in response to each successive clock pulse which is produced during the remainder of the period of waveform $S_1$, the contents of shift register 727 are recirculated therein.

Let it be assumed that the nominal period of waveform $S_1$ is sufficient to contain ten clock pulses. When the duty cycle of waveform $S_1$ is increased, a greater number of clock pulses may be contained during this period. Conversely, when the duty cycle of the rectangular waveform decreases, a smaller number of clock pulses may be contained in the period. Of course, an increasing or decreasing duty cycle is a function of the phase modulation of the phase modulated rectangular pulse signal produced by wave shaper 408 and, therefore, is an indication of the displacement of scale 401 with respect to heads 402 and 403. Now, if it is assumed that the duty cycle of waveform $S_1$ remains constant, that is, it is neither increased nor reduced, at the occurrence of the ninth clock pulse at the output of AND gate 732, the contents of shift register 727 once again will be 0010. That is, its preset signal will have been recirculated therein back to its initial position. Since the ninth clock pulse supplied and AND gate 732 coincides with the completion of the period of pulse phase modulated rectangular waveform $S_1$, the signal stored in shift register 727, at this time, represents the duty cycle of the pulse phase modulated rectangular waveform. This signal is the same as the preset signal which had been loaded therein and, thus, represents that the pulse width modulated rectangular waveform remains substantially constant.

In response to the beginning of the next-following pulse width modulated rectangular waveform, that is, in response to the negative transition in waveform $S_1$, NOR gate 728 produces the output pulse shown in FIG.

11C. This output pulse enables AND gates 730 and 731 to generate a positive direction output pulse $U_1$ or a negative direction output pulse $D_1$ in the event that a binary "1" appears at output $Q_D$ or $Q_B$, respectively, of shift register 727. However, it is seen that the preceding pulse width modulated rectangular waveform $S_1$ was of a substantially constant duty cycle and, therefore, the preset signal 0010 now appears at output terminals $Q_A$–$Q_D$, respectively, of the shift register. That is, a binary "1" is not provided either at output terminal $Q_D$ or at output terminal $Q_B$. Consequently, neither positive nor negative direction output pulses $U_1$, $D_1$ are generated.

As before, the pulse produced at the output of NOR gate 728 in response to the negative transition in waveform $S_1$ deletes one clock pulse from the output of AND gate 732. Accordingly, during the period of this deleted clock pulse, the contents of shift register 727 are not shifted. Moreover, at the time of the negative transition of this deleted clock pulse, the pulse produced by NOR gate 728 terminates, and NOR gate 729 supplies a load pulse to shift register 727, as shown in FIG. 11D. At the occurrence of the next clock pulse included in clock phase $\phi_1$ (FIG. 11B), shift register 727 is supplied with this clock pulse via AND gate 732, and is responsive to the load pulse produced by NOR gate 729 to load the preset signal 0010 thereinto. This preset signal, which now is loaded once again into the shift register, is shown in FIGS. 11F–11I. This preset signal is recirculated within shift register 727 in response to the next successive clock pulses which are passed by AND gate 732.

As in the example described previously, upon the occurrence of the ninth clock pulse supplied to shift register 727 (which is equal to the tenth clock pulse supplied by clock phase $\phi_1$ during the period of waveform $S_1$), the preset signal 0010 once again is provided at output terminal $Q_A$–$Q_D$. However, let it now be assumed that the displacement of scale 401 with respect to heads 402 and 403 is such that the duty cycle of waveform $S_1$ is extended, as shown in FIG. 11A. This means that the period of waveform $S_1$ does not terminate upon this occurrence of the ninth clock pulse. Rather, a tenth clock pulse is supplied to shift register 727 by AND gate 732, to shift the binary "1" from stage C to stage D. This, of course, shifts the binary "1" from output terminal $Q_C$ to output terminal $Q_D$ of shift register 727, as shown in FIGS. 11F–11I. Now, when waveform $S_1$ terminates, the pulse produced by NOR gate 728 enables AND gate 730 to gate the binary "1" provided at output terminal $Q_D$, whereupon the positive direction output pulse $U_1$ is generated by AND gate 730, as shown in FIG. 11J. This output pulse is supplied through OR gate 733 as the positive displacement pulse P+, representing that scale 401 has been displaced by a predetermined incremental amount in the positive direction.

At the beginning of the period of the next-following waveform $S_1$, one clock pulse is deleted from the clock pulses passes by AND gate 732 to shift register 727, as shown in FIG. 11E, and as described above. Also, NOR gate 729 supplies the load pulse to the shift register, as shown in FIG. 11D. Consequently, upon the occurrence of the next-following clock pulse, i.e., the first clock pulse passed by AND gate 732 during this period of waveform $S_1$, shift register 727 is loaded with the preset signal 0010, as shown in FIGS. 11F–11I. In the manner described above, this preset signal is recirculated through shift register 727 in response to the succeeding clock pulses supplied to the shift register by AND gate 732. Let it now be assumed that the duty cycle of waveform $S_1$ is compressed, as shown in FIG. 11A. Consequently, upon the termination of this period of waveform $S_1$, that is, at the negative transition therein, AND gate 732 will have passed only eight clock pulses to shift register 727 (i.e., only nine clock pulses of clock phase $\phi_1$ will have been generated). Thus, at the end of this period of waveform $S_1$, preset signal in shift register 727 will have been circulated to provide the signal 0100 therein. That is, the binary "1" which initially had been loaded into stage C will have been circulated to stage B at the end of this period of waveform $S_1$, as shown in FIGS. 11F–11I. Accordingly, the pulse produced by NOR gate 728 in response to the negative transition in waveform $S_1$ enables AND gate 731 to gate the binary "1" provided at output terminal $Q_B$. AND gate 731 thus generates the negative direction output pulse $D_1$, shown in FIG. 11K, which is supplied by OR gate 734 as the negative direction displacement pulse P−.

Figure 10:
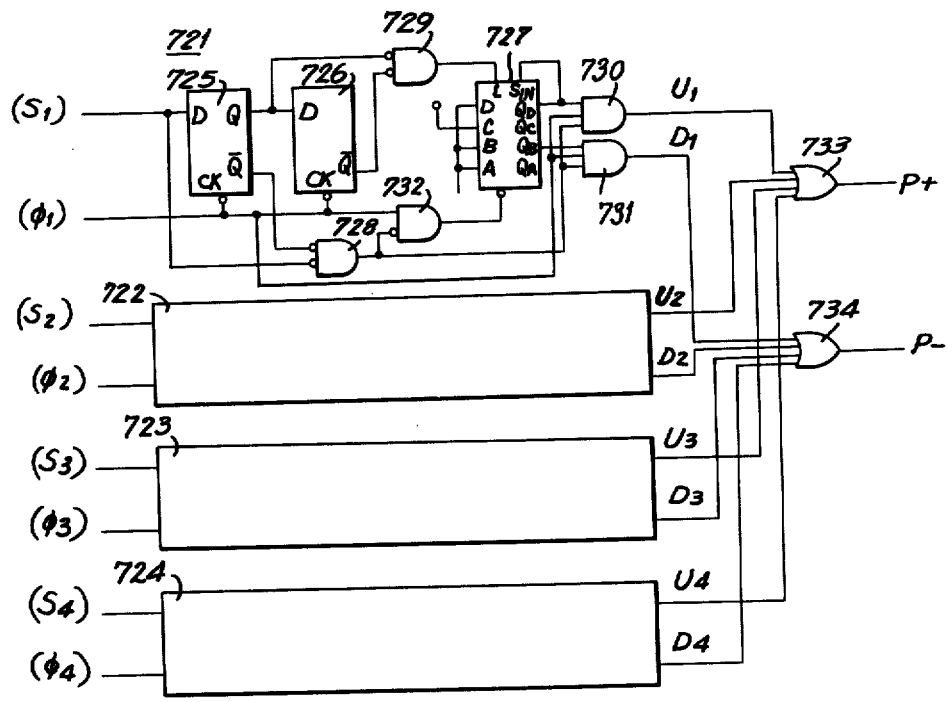
FIG. 10 is a logic diagram of one embodiment of the interpolating circuit shown in FIG. 7.
Figure 11:
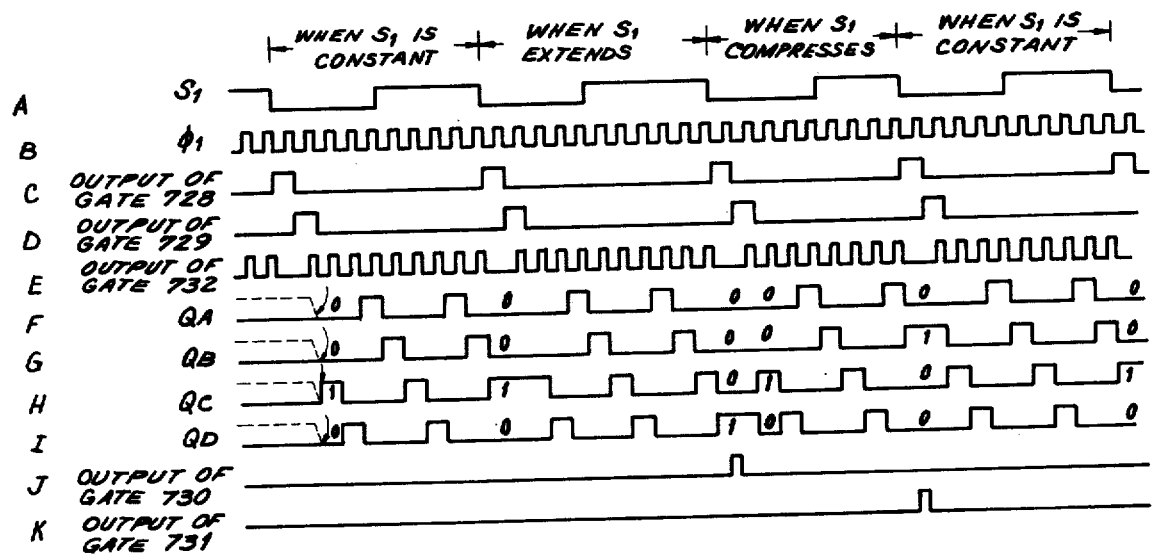
FIGS. 11A–11K are waveform diagrams which are useful in understanding the operation of the interpolating circuit shown in FIG. 10.

From the foregoing discussion of the operation of the embodiment shown in FIG. 10, it is seen that changes in the duty cycle of waveform $S_1$, that is, pulse width modulations in this rectangular waveform, are sensed by detecting the number of clock pulses of clock phase $\phi_1$ which occur within each period of the waveform. In the examples discussed above, this detection is made by presetting a predetermined binary signal into shift register 727 at the beginning of a period of waveform $S_1$, and then recirculating this signal for the duration of the period. Pulse width modulations are determined as a function of the particular stages of the shift register into which the preset signal has been shifted at the end of the waveform period. As an alternative, a counter can be provided for counting the clock pulses of clock phase $\phi_1$ which are produced during each period of waveform $S_1$. Phase modulations are determined as a function of the count attained by this counter at the completion of the period.

Interpolating circuits 722–724 operate in a manner similar to that described above with respect to interpolating circuit 721. It is appreciated that clock phases $\phi_2$, $\phi_3$ and $\phi_4$ are phase-displaced relative to clock phase $\phi_1$, each by a different amount, and that pulse phase modulated rectangular waveforms $S_2$, $S_3$ and $S_4$ likewise are phase displaced with respect to pulse width modulated rectangular waveform $S_1$ by corresponding amounts. As one numerical example, if the wavelength $\lambda$ of the calibrating signals on magnetic scale 401 is equal to 200 microns, then, by using a 4-phase interpolating circuit, i.e., an interpolating circuit comprised of circuits 721–724, a resolution of 1/40 can be attained in detecting displacement. That is, a positive direction or negative direction displacement pulse P+ or P− is produced whenever scale 401 is displaced by 5 microns. If lesser resolution is satisfactory, the interpolating circuit may be comprised of a 2-phase interpolating circuit, having a resolution of 1/20. That is, the interpolating circuit may include circuits 721 and 723, or circuits 722 and 724, whereupon each displacement pulse P+ or P− represents a displacement of 10 microns of magnetic scale 401. If even lesser resolution is satisfactory, a 1-phase interpolating circuit can be used, having a resolution of 1/10, whereupon a displacement pulse is produced whenever magnetic scale 401 is displaced by 20 microns. Hence, if the interpolating circuit is comprised of an m-phase interpolating circuit, it is appreciated that phase detector 513 likewise is comprised of m phase detecting stages.

From the foregoing description, it may be appreciated that, by energizing heads 402 and 403 with pulse signals as opposed to the sinusoidal energizing signals used in the embodiments of FIGS. 2 and 3, the output level obtained from heads 402 and 403 is increased by at least 20 dB over the output level produced by heads 207 and 208. Consequently, preamplifier circuits, such as amplifiers 209 and 210 of FIGS. 2 and 3, can be omitted from the present invention. Furthermore, the energizing circuit which is needed to energize heads 402 and 403 with pulse signals is simplified relative to the energizing circuit used in the embodiments of FIGS. 2 and 3. Specifically, the low pass filters which had been used heretofore to obtain the sinusoidal waveform in the energizing signals are omitted. Also, the amplifiers which are used to amplify the energizing signals supplied to the heads can be constructed, in accordance with the present invention, merely as a simple pulse switching circuit. Another advantage attained by this invention is that, since pulse signals are used as the head energizing signals, a reduction in the amount of power which is needed can be achieved. Thus, the overall apparatus of the present invention is markedly simplified compared to the displacement detecting apparatus of the prior art. Such simplified apparatus can be fabricated by conventional integrated circuit techniques. This results in a substantial reduction in the cost of this displacement detecting apparatus.

While the present invention has been particularly shown and described with reference to certain preferred embodiments, it would be readily apparent to those of ordinary skill in the art that various changes and modifications in form and details can be made without departing from the spirit and scope of the invention. For example, this displacement detecting apparatus need not be limited solely for use with a magnetic scale. As an alternative, the disclosed apparatus can be used in a measuring or scaling system which is provided with an inductosyn. Furthermore, heads 402 and 403 can be replaced by other transducers, and scale 401 may be provided with calibrating signals which are readily adapted to be reproduced by such transducers. Therefore, it is intended that the appended claims be interpreted as including these and other such changes and modifications.

What is claimed is:

1. Apparatus for detecting the displacement of a member having a magnetic scale thereon, said magnetic scale being provided with calibrating signals of a predetermined wavelength, said apparatus comprising:
   first and second magnetic heads disposed to reproduce the calibrating signals on said magnetic scale as said scale and said heads are displaced relative to each other;
   means for energizing said first and second magnetic heads with pulse signals, whereby each of said magnetic heads produces a balanced modulated pulse signal having at least a predetermined harmonic and being derived from the calibrating signal reproduced from said magnetic scale and the energizing pulse signal supplied thereto;
   adding means for adding the balanced modulated pulse signals produced by said first and second magnetic heads to obtain a phase modulated pulse signal;
   selecting means for selecting a predetermined higher harmonic of said phase modulated pulse signal;
   means for detecting predetermined increments of phase shift in said selected higher harmonic of said phase modulated pulse signal to produce output pulse signals representing corresponding increments of displacement; and
   amplitude equalizing means for equalizing the amplitudes of at least said predetermined harmonic in the balanced modulated pulse signals produced by said first and second magnetic heads.

2. The apparatus of claim 1 wherein said adding means comprises a summing transformer.

3. The apparatus of claim 1 wherein said means for energizing comprises a source of pulses having the fundamental frequency ($f_c/2$, whereby the fundamental frequency of the phase modulated pulse signal obtained from said adding means is equal to $f_c$.

4. The apparatus of claim 3 wherein said selecting means selects the $(n-1)$th harmonic of said phase modulated pulse signal to provide a phase modulated pulse signal of repetition rate $(n-1)f_c$, where n is an integer; and wherein said means for detecting comprises a source of clock pulses of frequency equal to $nf_c$, phase detecting means coupled to said source of clock pulses and supplied with said phase modulated pulse signal of repetition rate $(n-1)f_c$ for producing pulse signals of frequency $f_c$ having a parameter thereof modulated as a function of the phase modulated pulse signal of repetition rate $(n-1)f_c$, and phase sensing means connected to receive said pulse signals of frequency $f_c$ produced by said phase detecting means and connected to said source of clock pulses for using said clock pulses provided by said source to sense predetermined increments of positive and negative changes in said parameter of said received pulse signals of frequency $f_c$ and for producing output pulses representing each sensed increment.

5. The apparatus of claim 4 wherein said phase detecting means is comprised of m phase detecting stages, m being an integer, the inputs of said m phase detecting stages being connected in common to receive said phase modulated pulse signal of repetition rate $(n-1)f_c$; and said source of clock pulses includes a clock generator for generating m respective phases of clock pulses, each of said phase having a frequency $nf_c$ and each said phase being supplied to a respective phase detecting stage, whereby the m phase detecting stages produce m modulated pulse signals each of frequency $f_c$ and all being phase displaced with respect to each other.

6. The apparatus of claim 5 wherein each phase detecting stage comprises a timing pulse controlled flip-flop circuit having a data input connected to receive said phase modulated pulse signal of repetition rate $(n-1)f_c$ and a clock input connected to receive a respective phase of said clock pulses for producing a rectangular wave signal of frequency $f_c$ and of pulse phase which varies as a function of the phase modulation of said phase modulated pulse signal.

7. The apparatus of claim 6 wherein said phase sensing means is comprised of m phase sensing stages, each stage being supplied with a rectangular wave signal produced by a respective timing pulse controlled flip-flop circuit and with a respective phase of said clock pulses for producing a first output pulse when said pulse phase of said supplied rectangular wave signal extends beyond a predetermined increment and for producing a second output pulse when said pulse phase of said supplied rectangular wave signal is reduced beyond said predetermined increment.

8. The apparatus of claim 7 wherein each phase sensing stage is comprised of plural-stage shift register means; means for loading said shift register means with a pulse at a predetermined time following a particular transition in said rectangular wave signal and for circulating said pulse through said plural-stage shift register means in response to the clock pulses supplied thereto; and means for sensing the stage in said shift register means to which said pulse has been shifted in response to the next following particular transition to produce said first output pulse when said pulse has been shifted to a first stage and to produce said second output pulse when said pulse has been shifted to a second stage.

9. The apparatus of claim 3 wherein said source of pulses having the fundamental frequency ($f_c/2$) comprises clock generating means for generating clock pulses of a relatively high frequency, and frequency dividing means for dividing the frequency of said clock pulses down to said frequency ($f_c/2$); and wherein said means for detecting comprises timing pulse generating means responsive to said clock pulses to produce timing pulses, phase detecting means responsive to said timing pulses and supplied with said selected harmonic of said phase modulated pulse signal to produce pulse phase modulated rectangular wave signals whose pulse phase changes as a function of the phase modulation of said selected harmonic, and sensing means for sensing said pulse phase changes of said pulse phase modulated rectangular wave signals to produce an output pulse when said pulse phase changes by more than a predetermined incremental amount.

10. The apparatus of claim 9 wherein said sensing means comprises counting pulse generating means responsive to said clock pulses to produce counting pulses of a frequency higher than the repetition rate of said pulse phase modulated rectangular wave signals; means for determining the number of said counting pulses generated during a cycle of said pulse phase modulated rectangular wave signals; and means for producing output pulses representing incremental displacement of said member when said determining means determines that the number of said counting pulses generated during a cycle of said pulse phase modulated rectangular wave signals differs from a predetermined number.

11. The apparatus of claim 10 wherein said phase detecting means is comprised of a plurality of detecting stages all having inputs connected in common to receive said selected harmonic of said phase modulated pulse signal; and wherein said timing pulse generating means produces a plurality of phases of timing pulses, all of the same frequency and each being of a different phase with respect to the others, respective phases of said timing pulses being applied to respective stages of said detecting means, whereby each said stage produces a pulse phase modulated rectangular wave signal of corresponding phase.

12. The apparatus of claim 11 wherein said means for determining is comprised of a plurality of determining stages equal in number to said plurality of detecting stages, each determining stage being supplied a pulse phase modulated rectangular wave signal of respective phase for determining the number of said counting pulses generated during a cycle of said respective phase of pulse phase modulated rectangular wave signal; and wherein said means for producing output pulses is responsive to any of said determining stages.

13. The apparatus of claim 12 wherein said counting pulse generating means produces a plurality of phases of counting pulses, all of the same frequency and each being of a different phase with respect to the others, respective phases of said counting pulses being applied to respective stages of said determining means.

14. Apparatus for detecting the relative displacement x of a member with respect to first and second transducer means, said member being provided with uniformly spaced indicia thereon of a predetermined wavelength $\lambda$, said apparatus comprising:

first and second transducer means for reproducing said indicia from said member as a periodic function of $(2\pi/\lambda)x$;

means for supplying energizing pulse signals to said first and second transducer means, the repetition rate of said pulse signals being equal to ($f_c/2$), whereby each transducer means generates a modulated pulse signal of repetition rate $f_c$ and having a modulation component that is a function of $(2\pi/\lambda)x$;

adding means for adding the modulated pulse signals generated by said first and second transducer means to produce a phase modulated pulse signal having a fundamental frequency $f_c$ and harmonics thereof, the fundamental and harmonic components having a pulse modulation that is a function of $(2\pi/\lambda)x$;

harmonic selecting means for selecting the nth harmonic of said phase modulated pulse signal, said nth harmonic being represented as $E_n \sin(2\pi n f_c t + (2\pi/\lambda)x)$, where $E_n$ is an amplitude and where n is greater than one;

wave shaping means for shaping said selected nth harmonic of said phase modulated pulse signal to produce a further phase modulated pulse signal of repetition rate $nf_c$ and having a phase modulated component that is a function of $(2\pi/\lambda)x$;

phase detecting means including a source of timing pulses that is a multiple of the repetition rate $f_c$ and means connected to receive both said further phase modulated pulse signal of repetition rate $nf_c$ and said timing pulses to produce a pulse phase modulated rectangular wave of repetition rate $f_c$ and pulse phase variations that are a function of x; and sensing means for sensing if said pulse phase variations exceed a predetermined incremental amount in the positive and negative directions to produce first and second output pulses, respectively, representing that said displacement x is a positive and negative displacement of predetermined amount.

* * * * *